United States Patent
D'Arcangelis et al.

(10) Patent No.: US 7,655,265 B2
(45) Date of Patent: Feb. 2, 2010

(54) PROCESS CONTROL SCHEME FOR COOLING AND HEATING COMPRESSIBLE COMPOUNDS

(75) Inventors: Larry D'Arcangelis, South San Francisco, CA (US); Uwe Tapfer, Oakland, CA (US)

(73) Assignee: Nestec S.A., Vevey (CH)

( * ) Notice: Subject to any disclaimer, the term of this patent is extended or adjusted under 35 U.S.C. 154(b) by 606 days.

(21) Appl. No.: 10/886,008

(22) Filed: Jul. 6, 2004

(65) Prior Publication Data

US 2005/0132902 A1 Jun. 23, 2005

Related U.S. Application Data

(60) Provisional application No. 60/485,574, filed on Jul. 7, 2003.

(51) Int. Cl.
A23G 9/28 (2009.01)
(52) U.S. Cl. .................. 426/231; 426/515; 426/516; 426/524; 426/565; 62/70; 62/136
(58) Field of Classification Search .............. 62/62–70, 62/136; 426/231, 524, 515, 516, 565
See application file for complete search history.

(56) References Cited

U.S. PATENT DOCUMENTS

| | | |
|---|---|---|
| 2,067,683 A | 1/1937 | Routh |
| 2,131,510 A | 9/1938 | Gray et al. |
| RE20,987 E | 1/1939 | Routh |
| 2,206,419 A | 7/1940 | Miller |
| 2,767,553 A | 10/1956 | Lewis |
| 3,486,469 A | 12/1969 | Recas |
| 3,642,402 A | 2/1972 | Hutchinson et al. |

(Continued)

FOREIGN PATENT DOCUMENTS

DE 2538858 A1 3/1977

(Continued)

OTHER PUBLICATIONS

Windhab, E. et al.; "Combined aerator/freezer for ice cream manufactoure"; 19995, *European Dairy Magazine*, vol. 1, pp. 2835.

(Continued)

*Primary Examiner*—Drew E Becker
(74) *Attorney, Agent, or Firm*—Winston & Strawn LLP

(57) ABSTRACT

A process control scheme for use with an extruding apparatus for cooling and heating aerated or compressible compounds that are edible. Broadly, the process includes providing a mixture to an inlet of the extruding apparatus, monitoring the pressure profile across the extruding apparatus, moving the mixture through the extruding apparatus with at least one auger while subjecting the mixture to a thermo-dynamic process, automatically altering speed of the at least one auger if the pressure profile across the extruding apparatus is outside a predetermined range, and moving the mixture through an outlet of the extruding apparatus. The process may also include monitoring temperature of a thermodynamic liquid, monitoring the load of an auger motor, and automatically altering the temperature of the thermodynamic liquid and the load of the auger motor if one of either the temperature of the thermodynamic liquid and the load of the auger motor is outside a predetermined range.

48 Claims, 5 Drawing Sheets

U.S. PATENT DOCUMENTS

| | | |
|---|---|---|
| 4,100,304 A | 7/1978 | Getman |
| 4,201,558 A | 5/1980 | Schwitters et al. |
| 4,260,640 A | 4/1981 | Hartmann et al. |
| 4,268,532 A | 5/1981 | Bernard |
| 4,409,249 A | 10/1983 | Forkner et al. |
| 4,542,035 A | 9/1985 | Huang et al. |
| 4,580,905 A | 4/1986 | Schwitters et al. |
| 4,703,628 A | 11/1987 | Togashi et al. |
| 4,713,256 A | 12/1987 | Chaveron et al. |
| 4,738,862 A | 4/1988 | Bee |
| 4,758,097 A | 7/1988 | Iles |
| 4,786,514 A | 11/1988 | Wiedmann |
| 4,882,105 A | 11/1989 | Volk, Jr. |
| 4,948,618 A | 8/1990 | Hirokawa et al. |
| 5,024,066 A | 6/1991 | Goavec |
| 5,045,252 A | 9/1991 | Hahn et al. |
| 5,082,682 A | 1/1992 | Peterson et al. |
| 5,118,792 A | 6/1992 | Warren et al. |
| 5,122,315 A | 6/1992 | Darley |
| 5,161,389 A * | 11/1992 | Rockenfeller et al. ......... 62/480 |
| 5,215,777 A | 6/1993 | Asher et al. |
| 5,264,234 A | 11/1993 | Windhab et al. |
| 5,292,030 A | 3/1994 | Kateman et al. |
| 5,345,781 A | 9/1994 | Fels et al. |
| 5,348,753 A * | 9/1994 | Ahnell et al. ............... 426/231 |
| 5,403,611 A | 4/1995 | Tomita et al. |
| 5,433,967 A | 7/1995 | Kateman et al. |
| 5,439,695 A | 8/1995 | Mackey |
| 5,473,909 A | 12/1995 | Kateman et al. |
| 5,484,614 A | 1/1996 | Clem |
| 5,603,257 A | 2/1997 | Kateman et al. |
| 5,617,734 A | 4/1997 | Chase et al. |
| 5,620,732 A | 4/1997 | Clemmings et al. |
| 5,713,209 A | 2/1998 | Hunchar et al. |
| 5,758,571 A | 6/1998 | Kateman et al. |
| 5,894,030 A | 4/1999 | Gibson et al. |
| 5,919,510 A | 7/1999 | Fayard et al. |
| 5,922,379 A | 7/1999 | Wang |
| 5,957,040 A | 9/1999 | Feola |
| RE36,390 E | 11/1999 | Fels et al. |
| 6,001,408 A | 12/1999 | Dudacek et al. |
| 6,010,734 A | 1/2000 | Whelan |
| 6,082,120 A | 7/2000 | Hoffmann et al. |
| 6,093,438 A | 7/2000 | Vaghela et al. |
| 6,176,090 B1 | 1/2001 | Ufema |
| 6,187,365 B1 | 2/2001 | Vaghela et al. |
| 6,207,213 B1 | 3/2001 | Groux et al. |
| 6,228,412 B1 | 5/2001 | Groux et al. |
| 6,303,388 B1 | 10/2001 | Fahy et al. |
| 6,352,734 B1 | 3/2002 | Martin, Jr. et al. |
| 6,432,466 B2 | 8/2002 | Brake et al. |
| 6,436,460 B1 | 8/2002 | Daniel et al. |
| 6,485,768 B2 | 11/2002 | Feola |
| 6,491,960 B1 | 12/2002 | Daniel et al. |
| 6,497,913 B1 | 12/2002 | Gray et al. |
| 6,511,694 B2 | 1/2003 | Huang et al. |
| 6,514,555 B1 | 2/2003 | Fayard et al. |
| 6,558,729 B1 | 5/2003 | Riviere et al. |
| 6,565,908 B1 | 5/2003 | Daniel et al. |
| 6,598,516 B1 | 7/2003 | Gonon |
| 6,613,374 B1 | 9/2003 | Fayard et al. |
| 6,723,361 B2 | 4/2004 | Feola |
| 6,764,701 B1 | 7/2004 | Mochizuki et al. |
| 2002/0102343 A1 | 8/2002 | Spindler et al. |
| 2003/0211192 A1 | 11/2003 | Bakker et al. |

FOREIGN PATENT DOCUMENTS

| | | |
|---|---|---|
| DE | 3918268 C1 | 7/1990 |
| DE | 4202231 C1 | 6/1993 |
| EP | 0401512 A1 | 5/1990 |
| EP | 0559316 A1 | 9/1993 |
| EP | 0561118 A2 | 9/1993 |
| EP | 0713650 A1 | 5/1996 |
| EP | 0729822 B1 | 9/1996 |
| EP | 0877558 B1 | 1/1997 |
| EP | 0808577 A1 | 11/1997 |
| EP | 1212947 A1 | 6/2002 |
| EP | 1212948 A1 | 6/2002 |
| JP | 56-029962 A | 3/1981 |
| JP | 60-184781 | 9/1985 |
| JP | 62-074245 A | 6/1987 |
| JP | 62-055067 A | 10/1987 |
| JP | 64-163228 | 2/1991 |
| JP | 03-027276 A | 5/1991 |
| WO | WO 90/14775 A1 | 12/1990 |
| WO | WO 97/26800 A1 | 7/1997 |
| WO | WO 97/39637 A1 | 10/1997 |
| WO | WO 97/46114 A1 | 11/1997 |
| WO | WO 98/17125 A1 | 4/1998 |
| WO | WO 98/18350 A1 | 5/1998 |
| WO | WO 98/09534 A3 | 12/1998 |
| WO | WO 98/09536 A3 | 12/1998 |
| WO | WO 00/72697 A1 | 12/2000 |

OTHER PUBLICATIONS

Windhab, E. et al.; "Kombination von Aufschlagmaschine und Freezer in der Herstellung von Eiskrem"; 1995, *Deutsche Milchwirtschaft*, vol. 46, No. 22, pp. 1215-1221.

Windhab, E. et al.; "New Developments in Crystallization Processing"; 1999, *Journal of Thermal Analysis and Calorimetry*, vol. 57, pp. 171-180.

Windhab, E. et al.; "NEw Developments in Ice Cream Freezing Technology and Related On-Line Measuring Techniques"; Ice Cream International Diary Federation, ISMN 92 9098 029 3, pp. 112-131.

* cited by examiner

PROCESS CONTROL SCHEME FOR COOLING AND HEATING COMPRESSIBLE COMPOUNDS

CROSS-REFERENCES TO RELATED APPLICATIONS

This application is a non-provisional application and claims the benefit of Application No. 60/485,574, filed Jul. 7, 2003, entitled "Process Control Scheme for Cooling and Heating Compressible Compounds," the disclosure of which is incorporated herein by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

1. Field of the Invention

The present invention relates to a process control scheme for cooling and heating compressible compounds, and more particularly, to a process control scheme for making a frozen novelty such as ice cream, frozen yogurt, etc. with an extruding apparatus.

2. Description of the Prior Art

It is known to aerate a mix for the preparation of an ice cream through the use of an aerating apparatus that generally includes a rotating element that fits into the barrel of a continuous ice cream freezer. This aerating apparatus is commonly referred to as a dasher. Rotation of the dasher imparts a mechanical energy into the mix in order to achieve aeration and generate a fat network by aggregating some of the fat droplets. This aggregation is necessary for product stability.

For many continuous industrial freezers, there are a variety of dasher types available. These may be differentiated from each other by the volume displaced within the freezer barrel that may be assessed by simply filling the freezer barrel with a liquid, such as water, and measuring defined by liquid displaced with the dasher is fitted therein. A dasher described as a Series 80 indicates that this rotating element occupies 80% of the available internal volume of the freezer barrel so that only 20% of the space is available to be occupied by the mix to be aerated. By contrast, a Series 15 dasher, also known in the art, demonstrates a displacement volume of only 15% of the internal barrel volume, the remaining 85% being available to be occupied by a mix to be aerated.

In conventional ice cream processing it is generally accepted that higher displacement dashers such as the Series 80 give rise to high quality ice cream being highly churned (Ice Cream 5.sup.th Edition, W. S. Arbuckle et al., page 183) thus showing optimal levels of fat de-stabilization, while at the same time having product dryness, good meltdown resistance and product hardness. These displacement dashers are therefore the standard form of aerating means used in ice cream manufacture.

Traditional frozen aerated products such as ice cream products contain approximately 8 to 12% fat in addition to stabilizers and emulsifiers in order to provide the desired quality product. However, it is now preferable to provide such products that are low fat and that do not include the additives. To date, products provided that are low fat and without added stabilizers and emulsifiers have been inferior in quality in that they are fast melting, have a low percentage of destabilized fat, and are unstable to heat shock, and hence, quickly become very icy. Furthermore, such products have a reduced creaminess perception.

Cold extrusion of aerated compositions is known in the art through the extrusion of a pre-aerated foam through a freezing device. Pre-aeration has conventionally been undertaken through the use of an aerating means in the form of a high displacement dasher. The foam once aerated is then transferred to cold extrusion apparatus. The ice cream extrusion freezer processes ice cream produced in a standard ice cream freezer. The extrusion freezer applies work to the product via shear forces generated by the augers moving the product through the extrusion freezer barrel at very low speeds while removing heat from the product with ammonia as a refrigerant.

The residence time of the ice cream in the extrusion freezer barrel and hence the amount of heat removed from the ice cream may be controlled by varying the speed of the augers. Due to the compressible nature of ice cream, a slower auger speed results in a longer product residence time in the extrusion freezer barrel and therefore greater heat transfer. The rate of heat transfer also depends on the temperature difference between the ice cream and the extrusion freezer ice cream barrel wall. The temperature of the extrusion freezer ice cream barrel wall may be controlled by regulating the temperature of the ammonia refrigerant in the concentric ammonia barrel surrounding the inner extrusion ice cream barrel. A colder ammonia temperature results in more heat being removed from the ice cream moving through the barrel.

Until the present invention, it has not been possible to make frozen novelties such as ice cream of adequate quality with an extruder due to the thickening (or lack thereof) of the ice cream while in the extrusion freezer and the varying pressures that result by altering the temperature. Additionally, the recipe for the frozen novelty affects operation, and ultimately quality of the frozen novelty, of the extrusion freezer.

Several factors are considered in the design of an effective automatic control system for the extrusion freezer including optimizing the work/energy applied to the product, maximizing the heat removed from the product, and leaving the product overrun (volume ratio of mix and air in the ice cream) generated by the standard ice cream freezer unaltered without exceeding system pressures due to excessive ice cream viscosities.

SUMMARY OF THE INVENTION

The present invention provides a process control scheme for use with an extruding apparatus for cooling and heating aerated or compressible compounds that are edible. Broadly, the process includes providing a mixture to an inlet of the extruding apparatus, monitoring pressure at the input of the extruding apparatus, moving the mixture through the extruding apparatus with at least one auger while subjecting the mixture to a thermodynamic process, automatically altering speed of the at least one auger if the pressure profile across the extruder is outside a predetermined range, and moving the mixture through an outlet of the extruding apparatus. Preferably, the process also includes monitoring temperature of a heat transfer medium, monitoring the load of an auger motor, and automatically altering the temperature of the heat transfer medium and the load of the auger motor if one of either the temperature of the heat transfer medium and the load of the auger motor is outside a predetermined range.

The present invention is especially suitable for making a frozen novelty such as ice cream, frozen yogurt, etc. and thus, the process preferably involves subjecting the mixture to a freezing process as it moves through the extruding apparatus. Preferably, the temperature of a coolant is monitored and the load of the auger motor is also monitored. The temperature of the coolant and the load of the auger motor are automatically altered if one of either the temperature of the coolant and the load of the auger motor is outside a predetermined range.

The present invention also provides a system for cooling and heating aerated or compressible compounds that are edible. The system includes an extruding apparatus comprising at least one auger, at least one auger motor, and an outlet. A central controller in communication with the extruding apparatus is provided and a graphical user interface that is in communication with the central controller is also provided. An inlet and outlet pressure monitor may be provided that are in communication with the central controller and a coolant temperature monitor is provided that is in communication with a central controller. An auger motor load monitor is provided that is in communication with the central controller. In use, a user uses the graphical user input to select target points or target ranges for the inlet pressure, auger motor load and coolant evaporation temperature. The central controller automatically adjusts appropriate components if a target point or range is not met by a predetermined amount.

Other features and advantages of the present invention will be apparent in view of the following detailed description of preferred exemplary embodiments.

DETAILED DESCRIPTION OF THE INVENTION

The present invention is directed to a process control scheme for processing compressible and/or aerated compounds with an extruder apparatus while subjecting the compound to a thermodynamic process using a heat transfer medium. In a preferred embodiment, the compound is a mixture that becomes a frozen novelty such as ice cream, frozen yogurt, etc. Thus, for simplicity and clarity, the present invention will be described with reference to making a frozen novelty with an extruder apparatus, but those skilled in the art will understand that there are many other uses for the present invention and that it shouldn't be limited to the embodiments described herein. For example, the present invention may be used for extruding chocolate, or liquid aerated plastics or films.

Figure 1:
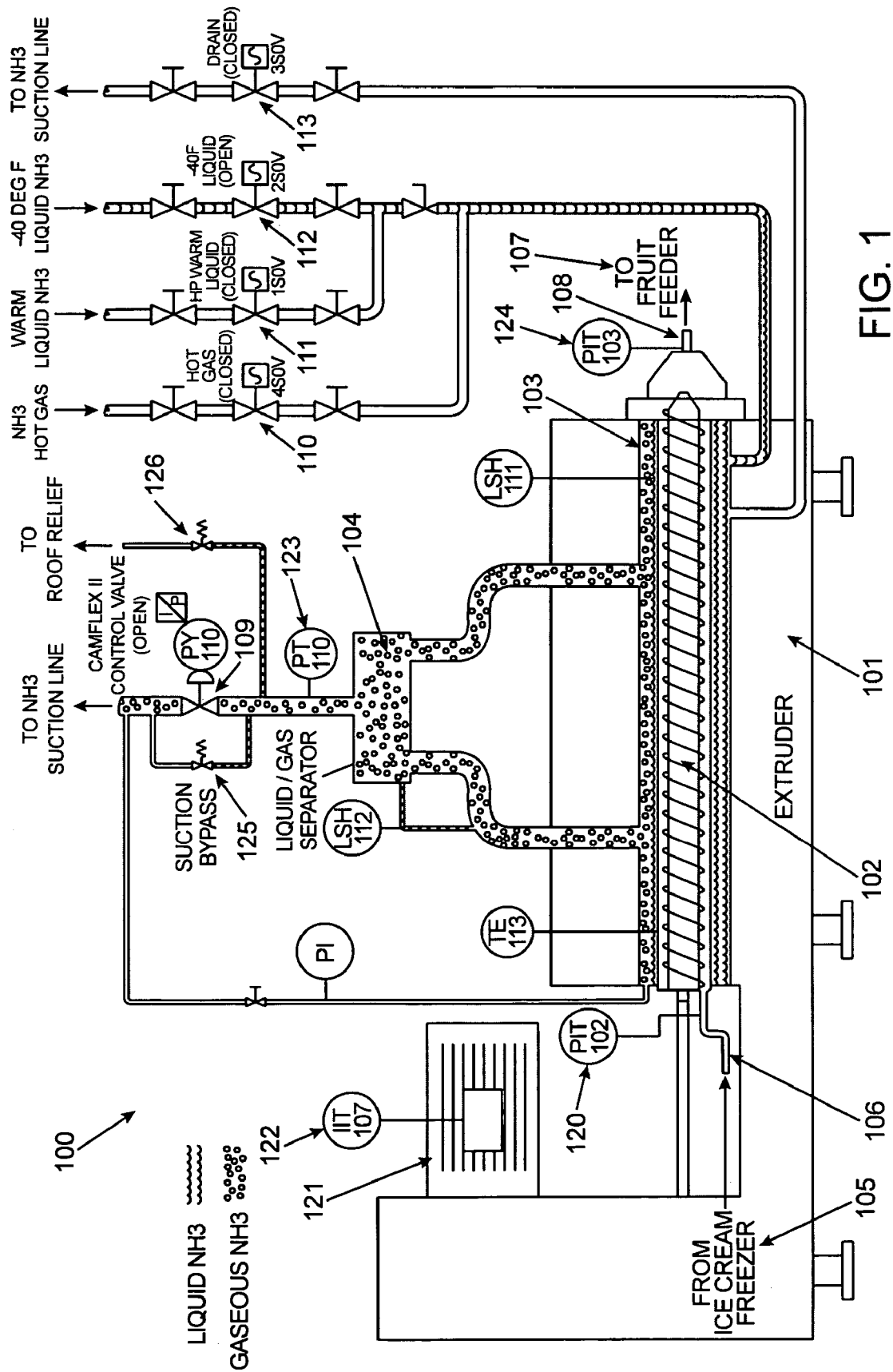
FIG. 1 is a schematic illustration of a refrigeration system using a process control scheme in accordance with the present invention in a production cooling mode.

FIG. 1 illustrates an extruder freezer system 100 that includes an extruder freezer 101 that includes at least one auger 102. Preferably, there are two augers 102a, 102b that are side by side. Extruder 107 includes a chamber 103 for cooling liquid such as ammonia that substantially surrounds the barrel that includes the augers. A liquid/gas separator 104 is provided that is in communication with chamber 103. Extruder 107 receives a mixture from ice cream freezer 105 at inlet 106. The finished product is provided to an ingredient feeder 107 through outlet 108 for adding ingredients such as, for example, chocolate, fruit, etc. A central controller (not shown) is provided that controls operation of extruder freezer system 100 via a graphical user interface (GUI). System 100 includes a coolant suction valve 109. Valves 110-113 are used for adding and removing coolant. Valves 125 and 126 are preferably spring loaded safety relief valves.

Generally, the texture of ice cream is improved by applying work/energy to the product while removing heat from the product. The residence time of the product in the extrusion freezer barrel and hence the amount of heat removed from the product may be controlled by varying the speed of the augers. A slower auger speed results in a longer product residence time in the extrusion freezer barrel and therefore greater heat transfer. The rate of heat transfer also depends upon the temperature difference between the product and the extrusion freezer barrel wall. The temperature of the extrusion freezer barrel wall can be controlled by regulating the temperature of the ammonia refrigerant in the concentric ammonia barrel surrounding the inner extrusion barrel. A colder ammonia temperature results in more heat being removed from the product moving through the barrel.

Preferably, the operation of the extruder freezer is controlled by monitoring the inlet pressure with sensor 120 at inlet 106 and the outlet pressure with sensor 124 at outlet 108 to thereby monitor the pressure profile of the extruder freezer. The pressure profile may be monitored by simply monitoring the pressure at a single point, such as, for example, the inlet, the outlet, at some point in between, or at multiple points. The pressure profile may also be monitored as a function of multiple points, e.g., the difference between the inlet pressure and the outlet pressure. Additionally, preferably the operation of the extruder freezer is further controlled by monitoring the load of auger motor 121 with sensor 122. Finally, preferably the operation of the extruder freezer is further controlled by monitoring the evaporation temperature/pressure of the ammonia with sensor 123.

The inlet pressure is used in a proportional-integral-derivative (PID) inlet pressure control loop. The inlet pressure control loop compares the actual extruder freezer inlet pressure with an inlet pressure set point entered at the GUI screen illustrated in FIG. 5. The control loop automatically varies the auger speed to maintain the inlet pressure at the set point pressure. This loop is reverse acting, meaning that the calculated error used by the control loop is:

Error=Process Variable−Set Point where

Process Variable=Actual measured inlet pressure

Set Point=Inlet pressure set point entered from GUI

Because the PID control block increases its output signal, in this case the auger speed, for an increase in error, the auger speed increases for the case where the actual inlet pressure climbs too high relative to the pressure set point and visa versa.

The present invention found that without the input pressure control loop, the inlet pressure fluctuated substantially due to events downstream in the process including ingredient feeder settings and product flow path changes. Furthermore, because the actual inlet pressures are typically high as a result of the relatively slow auger speeds necessary to achieve a cold enough product draw temperature given the available ammonia suction, these fluctuations in inlet pressure would often result in very high inlet pressures posing the threat of damage to the equipment.

The inlet pressure control loop enables the operator to select a high enough inlet pressure set point to achieve the desired product draw temperatures, given the available ammonia suction, without the need of the operator to constantly monitor and adjust for pressure fluctuations caused by downstream disturbances. Furthermore an inlet pressure set point is selected that works for different ice cream flow rates and for different ice cream formulations since the extrusion freezer auger speed varies based primarily on the inlet pressure independent of the product flow rate and viscosity.

The auger motor load control preferably includes two cascade PID control loops: an auger motor load PID control loop and an ammonia evaporation temperature PID control loop.

Figure 5:
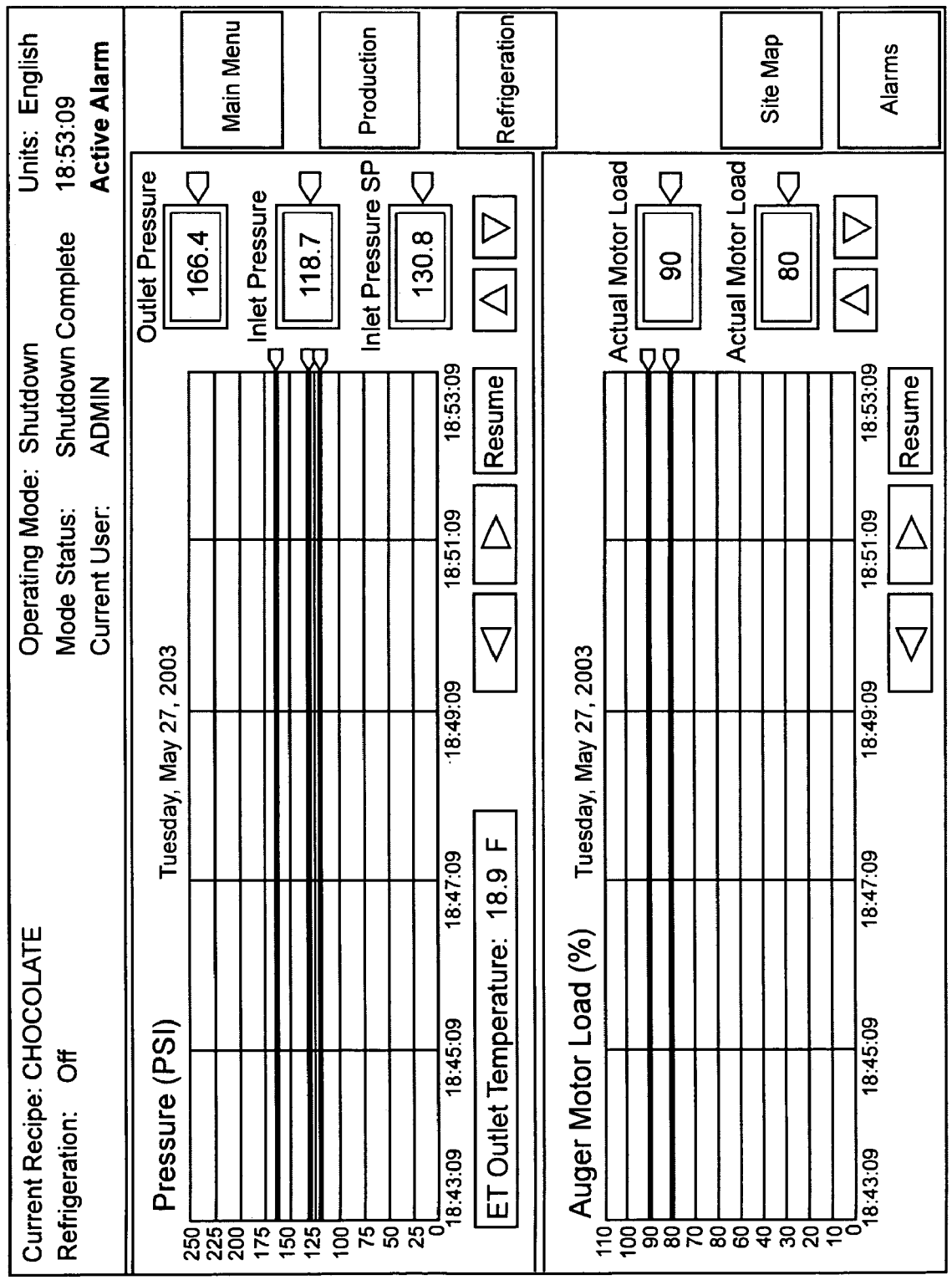

The auger motor load control loop preferably compares the actual motor load (preferably by measuring amps) with the load set point entered from the GUI screen illustrated in FIG. 5. The output of this control loop is tied to the set point of the ammonia evaporation temperature control loop which automatically varies the ammonia suction control valve to indirectly maintain the auger motor load at the load set point. The auger motor load control loop is forward acting, meaning that the calculated error used by the control loop is:

Error=Set Point−Process Variable where

Process Variable=Actual auger motor load

Set Point=Load set point entered from GUI

The control loop output, and hence the ammonia evaporation temperature control loop set point, increases for the case where the actual motor load is too low relative to the load set point and visa versa. Note that the ammonia evaporation temperature set point is preferably scaled such that an increase in set point translates to a colder setting (scaled as +20° F. To −43° F.). Therefore as the auger motor load control loop output increases as the ammonia evaporation temperature set point gets colder.

The auger motor load control loop is preferably cascaded with the ammonia evaporation temperature control loop so that the evaporation temperature control loop can clamp the ammonia evaporation temperatures to within ammonia vessel 103 temperature rating. Although it may be much simpler to allow the auger motor control loop output to directly modulate the ammonia suction control valve, the resulting evaporation temperature would depend on the available suction pressure at any given moment, which could result in an evaporation temperature colder than the vessel rating.

The ammonia evaporation temperature control loop compares the actual evaporation temperature (calculated from the evaporation pressure signal 123) with the evaporation temperature set point generated from the cascaded auger motor load control loop. The control loop automatically varies the ammonia suction control valve position to maintain the evaporation temperature at the set point temperature. This loop is also forward acting, meaning that the calculated error used by the control loop is:

Error=Set Point−Process Variable where

Process Variable=Actual ammonia evaporation temperature

Set Point=Evaporation temperature set point generated by auger motor load loop

Therefore the suction control valve position increases in the case where the actual evaporation temperature is too warm relative to the temperature set point and visa versa. One would initially think that this loop should be reverse acting however, because the set point for this loop is scaled in decreasing order (+20° F. To −43° F.) a forward acting loop is used.

Because high extruder freezer outlet pressures may occur due to high viscosity product as well as downstream process changes, a high outlet pressure warning alarm is preferably interlocked with the auger motor load control loops. If a high outlet pressure warning alarm occurs, then the auger motor load control loop is automatically switched to a manual control mode and the ammonia evaporation temperature control loop set point is increased to a warmer setting by preferably 3° F. This temperature may be higher or lower as desired. The evaporation temperature is preferably monitored in 30 second intervals (once again this may be higher or lower as desired) and the temperature set point increased by 3° F. increments (once again this may be higher or lower as desired) if the high pressure condition still exists. If the high outlet pressure condition is cleared for preferably 3 minutes then the auger motor load control loop switches back to an automatic control mode.

Preferably, there are three operating modes for the extruder freezer: Shutdown Mode, Production Mode and CIP Mode.

Figure 2:
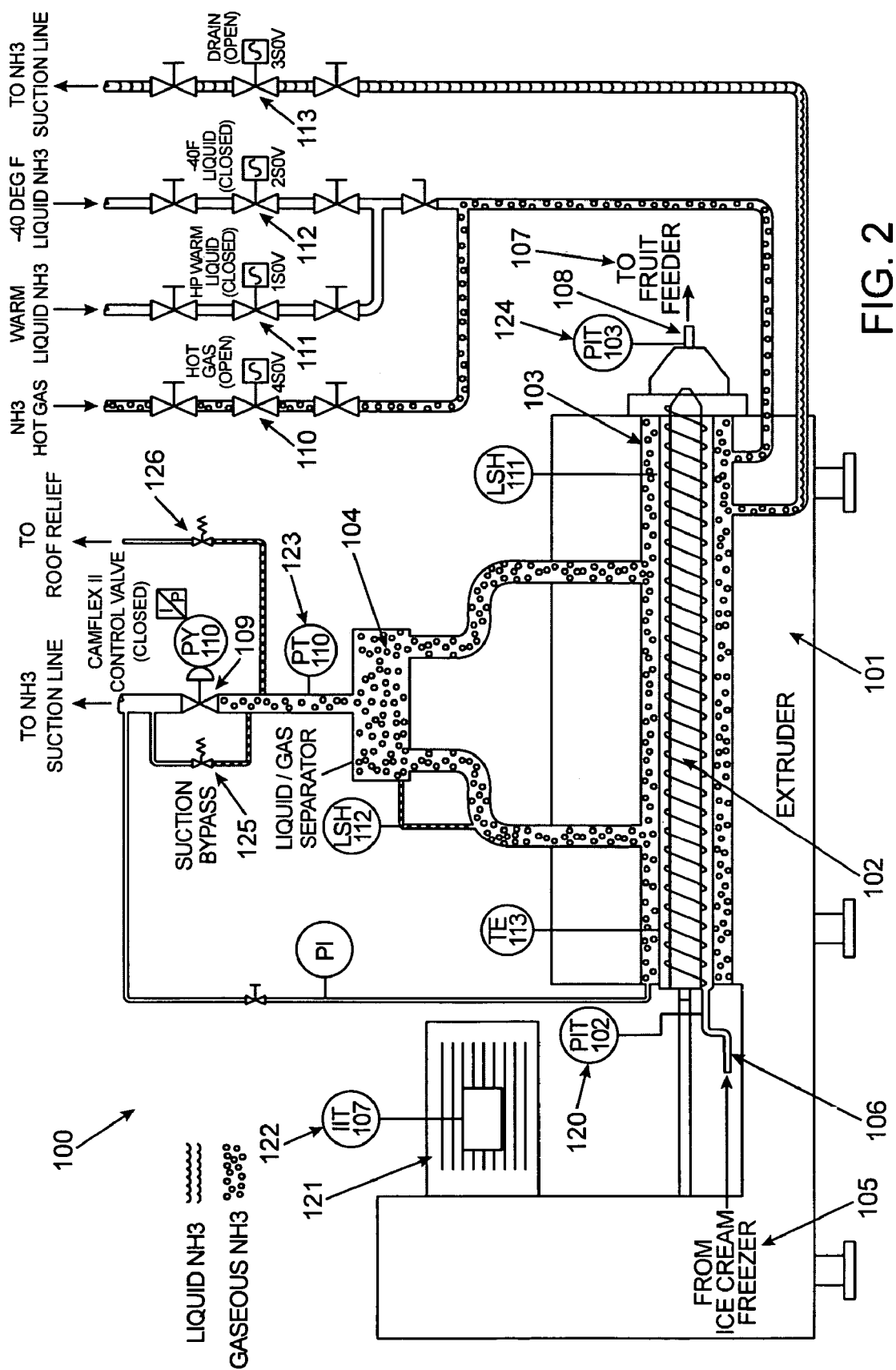
FIG. 2 is a schematic illustration of a refrigeration system using a process control scheme in accordance with the present invention in a shutdown mode.

An operator may switch to Shutdown Mode from the GUI. Additionally, the system may automatically switch to Shutdown Mode due to a system alarm. As may be seen in FIG. 2, during Shutdown Mode, the liquid ammonia solenoid valves close (if open), the ammonia suction control valve closes, and the ammonia drain valve opens. Preferably, after a 5 second delay the ammonia hot gas valve opens.

The operator ia able to switch to Production Mode from the GUI. The extruder freezer preferably stays idle (augers off) until ice cream is detected at the inlet of the extruder freezer. When the low operating pressure set point is exceeded then the augers run at a set speed based on the loaded recipe. If the inlet pressure has remained above the low operating set point with the auger running for 30 seconds then the system preferably automatically initiates a refrigeration startup. Production Mode has 3 control loops: Inlet Pressure Control, Auger Motor Load Control, Ammonia Evaporation Temperature Control.

Preferably, Production Mode has 2 sub modes: Pre-Cool Mode and Cooling Mode. Production Mode preferably always starts in Pre-Cool sub mode.

Figure 3:
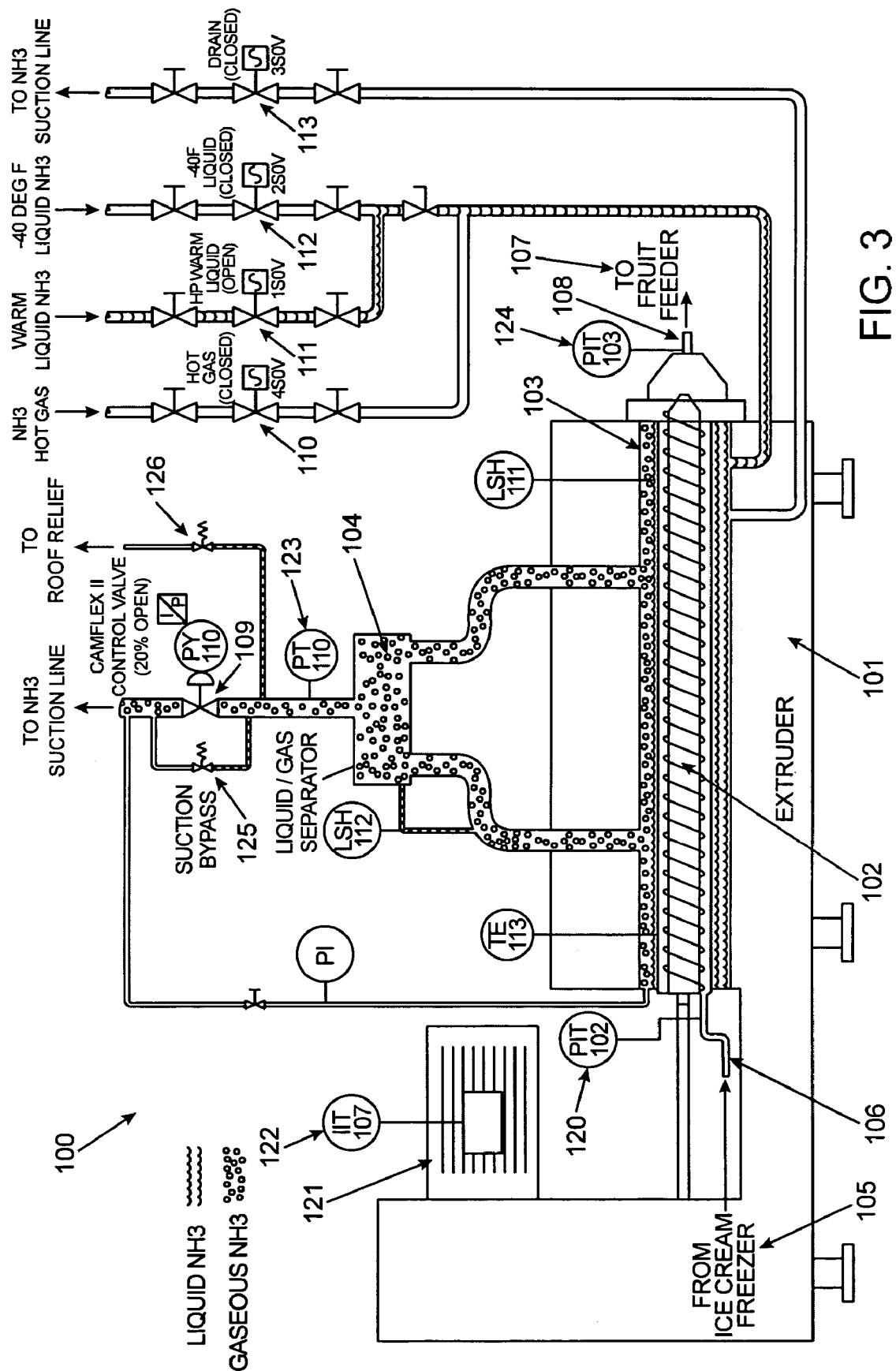
FIG. 3 is a schematic illustration of a refrigeration system using a process control scheme in accordance with the present invention in a production pre-cool mode.

In the Pre-cool mode, the auger motor control and evaporation temperature control are preferably both in a manual mode when the system enters Pre-cool mode. As may be seen in FIG. 3, the fast fill liquid ammonia valve 111, preferably using high pressure warm liquid ammonia to avoid thermally shocking the empty ammonia vessel, automatically opens filling the extruder freezer ammonia vessel. When the level in the ammonia vessel reaches the liquid ammonia control level switch, then the valve preferably automatically closes. The ammonia suction control valve preferably opens 20% while the vessel is filling with liquid ammonia. When the level in the ammonia vessel reaches the liquid ammonia control level switch, then the auger motor load control and ammonia evaporation temperature control preferably switch to Automatic Mode. In Automatic Mode the ammonia suction control valve position preferably varies to regulate the ammonia evaporation suction temperature to the set point generated by the auger motor load control loop. The auger motor load control set point may be changed from the GUI at this time if needed.

Preferably, once filled to the liquid ammonia control level switch with warm liquid ammonia, the control fill liquid ammonia valve 112, preferably using −40 degree pumped liquid ammonia, opens when the liquid ammonia level in the vessel drops below the liquid ammonia control level switch and closes when the level exceeds the liquid ammonia control level switch. Debounce timers are preferably used on the liquid ammonia control level switch to keep the control fill liquid ammonia valve from chattering. If the auger motor load control loop drives the ammonia evaporation temperature control loop set point to a setting preferably warmer than 0 degrees Fahrenheit, then preferably only warm liquid ammonia is used to maintain the vessel liquid ammonia level.

Preferably, the inlet pressure control remains in Manual Mode with the augers running at a constant speed set by the Auger Speed Set Point. The auger speed set point may be changed at anytime during Pre Cool Mode from the GUI. Once the vessel is filled to the liquid ammonia control level switch, the inlet pressure control may be switched between Manual and Automatic Modes from the GUI.

Figure 4:
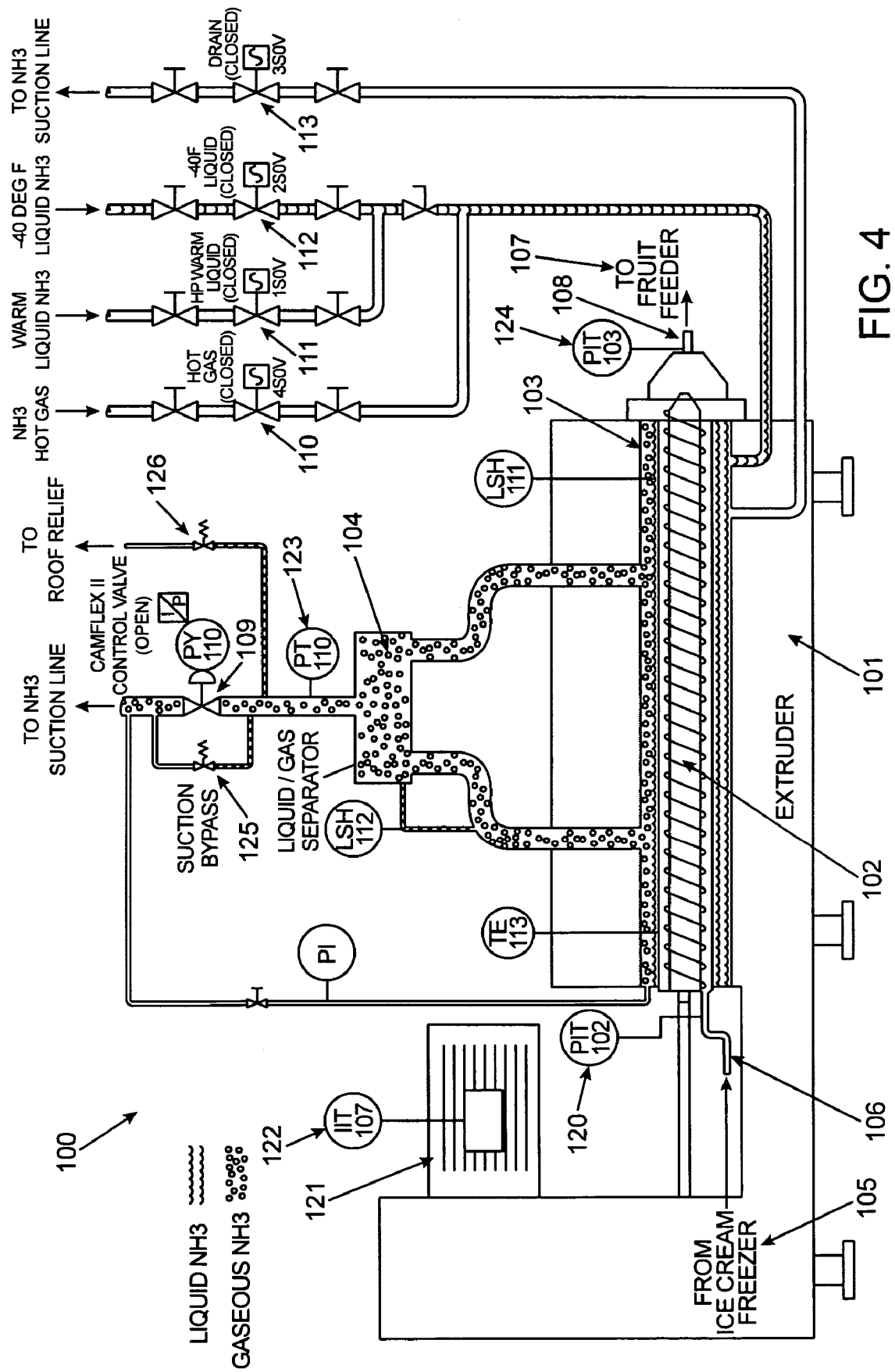
FIG. 4 is a schematic illustration of a refrigeration system using a process control scheme in accordance with the present invention in a production cooling mode; and, FIG. 5 is an illustration of a graphics user interface (GUI) Production Screen for a process control scheme in accordance with the present invention.

In the cooling mode after the extruder freezer ammonia vessel has been filled to the liquid ammonia control level switch level at least once and the ammonia evaporation temperature in the vessel is cold enough, preferably below 15 degrees Fahrenheit, then the system preferably automatically switches to Cooling Mode, as may be seen in FIG. 4. The auger motor load control set point preferably may be changed at anytime during Cooling Mode from the GUI. The load set point is preset based upon the loaded recipe. The ammonia suction control valve continues to regulate the ammonia evaporation temperature in the vessel to the evaporation temperature set point generated by the auger motor load control loop.

The control fill liquid ammonia valve, preferably using −40 degree pumped liquid ammonia, opens when the liquid ammonia level in the vessel drops below the liquid ammonia control level switch and closes when the level reaches the liquid ammonia control level switch. If the auger motor load control loop drives the ammonia evaporation temperature control loop set point to a setting preferably warmer than 0 degrees Fahrenheit, then only warm liquid ammonia is used to maintain the vessel liquid ammonia level.

The inlet pressure control switches to Automatic Mode when the system switches to Production Cooling Mode. In automatic mode the auger speed varies to regulate the extruder freezer inlet pressure. The inlet pressure set point preferably may be changed at anytime during Cooling Mode from the GUI. The inlet pressure set point is preset based on the loaded recipe. The inlet pressure control preferably may be switched between Manual and Automatic Modes from the GUI at any time during Cooling Mode. Once in Manual Mode the auger speed set point preferably may be manually adjusted.

Preferably, if the extruder freezer outlet pressure is too high (Outlet High Pressure Warning Set Point), then an alarm is generated on the GUI, the auger motor load control switches to Manual Mode, and the ammonia evaporation temperature set point automatically increases by 3 degrees Fahrenheit in an attempt to reduce the outlet pressure to an acceptable level. The outlet pressure is reevaluated preferably 30 seconds after each evaporation temperature set point change and adjusted again if necessary. These values may be changed if desired.

Preferably, if the extruder freezer outlet pressure high warning condition has cleared for 3 minutes (or longer or shorter if desired), then the auger load control loop switches back to Automatic Mode.

The parameters for operation and control of the system generally depend upon the compound moving through the extruder freezer. In the preferred embodiment, this is generally dependent upon the recipe for the frozen novelty.

Recipe handling is an integral component of the control system. The recipe system stores recipes that preferably include a recipe name, recipe initial auger speed, recipe initial inlet pressure set point, and auger motor load set point. The GUI recipe menu preferably allows the operator to select an existing recipe, edit an existing recipe, delete an existing recipe, add a new recipe, and save the current extruder freezer settings to the current selected recipe.

Other embodiments and features of a control system in accordance with the present invention will be described in the following paragraphs.

In one embodiment, the extrusion freezer control system design allows the operator to set the auger speed and ammonia evaporation temperature set points from a computer display located on the freezer. The operator typically sets the auger speed set point as slow as possible with the coldest possible ammonia evaporation temperature to try and achieve the coldest possible ice cream draw temperature and to maximize the auger motor power demand. The minimum auger speed is usually limited by the high pressures at the extrusion freezer inlet and outlet resulting from the increased ice cream viscosity in the extrusion freezer.

The auger speed set point in revolutions per minute (RPM), entered on the computer display by the operator, is converted to a corresponding speed command signal to the variable frequency drive that controls the auger motor. The variable frequency drive varies the frequency and voltage to the motor based on the speed command signal therefore varying the auger motor speed.

The auger speed control is preferably "open-loop" control; that is there is no feedback signal from the motor to tell the controller how fast the auger motor is actually running. Tests performed with encoder feedback from the auger motor to the controller indicate that the fluctuations in the auger motor speed at set frequency command signals from the variable frequency drive are negligible and therefore an open-loop design is implemented to reduce the complexity of the auger speed control system.

The ammonia evaporation temperature controller automatically regulates the evaporation temperature of the ammonia in the outer ammonia barrel surrounding the extrusion freezer ice cream barrel. The operator enters an evaporation temperature set point in degrees Celsius (° C.) from the computer display and the controller automatically modulates a control valve in the ammonia suction line to regulate the ammonia evaporation temperature in the extrusion freezer ammonia barrel.

Unlike the auger speed control, the ammonia evaporation temperature control is preferably a "closed-loop" controller; that is, the actual ammonia evaporation temperature is fed back to the controller. The feedback signal is actually a pressure signal from a sensor located in the ammonia suction line between the extrusion freezer ammonia barrel and the modulating control valve. The controller utilizes internal ammonia look-up tables to convert the evaporation pressure signal to a corresponding temperature.

A pressure sensor is preferably used instead of a temperature sensor to remove the lag time inherent in temperature measurement. A diagram of the ammonia evaporation temperature control system is shown in the following diagram, where:

PV—Actual ammonia evaporation temperature (−57° C. to +27° C.)

SP—Set point temperature entered by operator (−42° C. to −6° C.)

CV—Ammonia suction control valve position (0 to 100%)

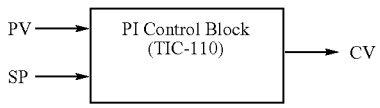

The evaporation temperature controller preferably utilizes a proportional-integral (PI) control algorithm as shown in the following diagram. The controller uses this algorithm to continuously calculate the control variable (CV) based on the error between the process variable (PV) and set point (SP). The ammonia evaporation temperature controller action is reverse acting, which means that the error calculated by the PI algorithm is equal to the process variable minus the set point (PV−SP). Therefore, because a larger error results in a greater CV output, as the actual ammonia evaporation temperature gets warmer (PV increases) the control valve opens more (CV increases) to reduce the evaporation temperature.

This control system design provides a suitable method of controlling the extrusion freezing process. The computer display provides an efficient and easy-to-use interface for the operator to the control the process. The operator typically sets the auger speed set point as slow as possible with the coldest possible ammonia evaporation temperature to try and achieve the coldest possible ice cream draw temperature and to maximize the energy/work input to the product.

In another embodiment, if an extrusion freezer high inlet or outlet pressure warning alarms occurs, the controller automatically increases the auger speed set point and notifies the operator that an automatic auger speed set point adjustment has been made. The high pressure alarms are preferably monitored on 30 second intervals and the auger speed set point is preferably increased by 0.2 RPM increments if the high pressure condition still exists. By increasing the auger speed the residence time of the product in the extruder barrel decreases resulting in a lower extruded product viscosity and therefore lower system pressures.

With this embodiment, interlocking the auger speed control and the high pressure alarm at the outlet of the standard ice cream freezer (inlet to the extrusion freezer) greatly reduces the number of undesired system shutdowns. The high pressure interlock may not circumvent shutdowns in all cases, particularly when the operator reduces the auger speed rapidly while the extruded product has already achieved a high viscosity.

Interlocking the auger speed control with the high pressure alarm at the outlet of the extrusion freezer has shown success. Although over time the extruded ice cream viscosity decreases due to a shorter residence time in the extruder barrel, the immediate result of increasing the auger speed is to increase the pumping action of the augers and therefore increase the extrusion freezer outlet pressure even more. Because the outlet pressure is already close to the system shut down pressure this increased pumping action often results in a system shutdown.

Analyzing empirical data during this phase of testing reveals that measuring the motor torque required is more critical to the process and equipment sizing than measuring the required motor power. The correlation between motor power and auger speed indicates that the motor power demand increases little with slower auger speeds and also that less than fifty percent of the motor power capacity is being utilized. This incorrect observation has led to downsizing the auger motor and additionally downsizing the motor gearbox. Unfortunately it was later discovered that the torque demand on the augers exceeded the full load capacity of the new downsized motor. Further analysis reveals that the torque demand on the auger motor is typically near the full load capacity of the motor and that although the motor power increases little due to slower auger speeds, the motor torque demand (represented by motor amp draw) increases to a greater degree as the augers run slower and the extruded ice cream viscosity increases. This is due to the fact that the motor torque is directly proportional to the motor power and inversely proportional to the motor speed:

$$T \propto P/w \qquad (1)$$

where,

T—Motor Torque

P—Motor Power w—Motor Speed

Therefore, although the motor power remains relatively constant, the motor torque rapidly increases as the speed decreases.

In a further embodiment, the control system design is interlocks the extrusion freezer outlet pressure high alarm with the ammonia evaporation temperature control instead of the auger speed control.

Additionally the auger speed control is integrated into a new auger motor load control algorithm used to regulate the load (amps) on the auger motor and hence the amount of energy/work put into the product.

If an extrusion freezer high outlet pressure warning alarms occurs, the controller automatically increases the ammonia evaporation temperature set point (warmer setting) and notifies the operator that an automatic temperature set point adjustment has been made. The high pressure alarm is preferably monitored on 30 second intervals and the evaporation temperature set point is increased by 3° C. increments if the high pressure condition still exists. By increasing the evaporation temperature the heat transfer rate from the product to the surrounding ammonia is decreased resulting in a lower product viscosity and therefore a lower extrusion freezer outlet pressure.

The auger motor load controller preferably automatically regulates the auger motor load by varying the speed of the augers. The operator enters a load set point in percent from the computer display, where 100% equals the full load amp capacity of the auger motor, and the controller automatically varies the auger speed, and hence the residence time of the ice cream in the extrusion freezer barrel, to regulate the load on the auger motor.

Similar to the ammonia evaporation temperature control, the auger motor load control is a "closed-loop" controller. That is, the actual auger motor load (amps) is fed back to the controller. The auger motor load controller utilizes a proportional-integral (PI) control algorithm.

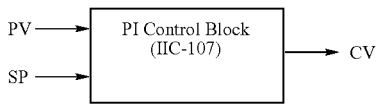

where,
- PV—Actual auger motor load (0 to 100%)
- SP—Set point auger motor load entered by operator (0 to 100%)
- CV—Auger speed (25 to 100%)

The controller uses this algorithm to continuously calculate the control variable (CV) based on the error between the process variable (PV) and set point (SP). Like the ammonia evaporation temperature controller, the auger motor load controller action is also reverse acting, which means that the error calculated by the PI algorithm is equal to the process variable minus the set point (PV−SP). Therefore, because a larger error results in a greater CV output, as the actual auger motor load increases (PV increases) the auger speed increases (CV increases) to reduce the load. A higher auger speed results in a shorter product residence time in the extrusion freezer barrel resulting in a lower ice cream viscosity and therefore a lower auger motor load.

An additional feature of the auger motor load controller is the capability of switching the controller between manual and automatic control modes from the computer display. In manual mode the auger speed control behaves as an open-loop controller and the operator may manually adjust the auger speed set point as described previously.

Note that the interlock between the auger speed control and the high pressure alarm at the outlet of the standard ice cream freezer (inlet to the extrusion freezer) remains functional in this embodiment. Should a high inlet pressure alarm occur, the auger motor load controller automatically switches to manual mode and the auger speed is automatically adjusted as described previously. Once the high pressure alarm incident has cleared for preferably at least 3 minutes, then the auger motor load controller automatically switches back to automatic mode and resumes regulation of the auger motor load by varying the auger speed. Moving the extrusion freezer high outlet pressure alarm interlock from the auger speed control to the ammonia evaporation temperature control helps to reduce the number of undesired system shutdowns. This high pressure interlock may not circumvent shutdowns in all cases, particularly when a disturbance downstream of the extrusion freezer causes a rapid increase in pressure.

The addition of an auger motor load controller allows the system to automatically adjust the auger motor speed to achieve a desired auger motor load and hence control the work/energy input to the product. A motor load set point of 100% may be entered from the computer display and the control system maximizes the work input to the product without exceeding the load capacity of the auger motor.

This control system design works well on a pilot scale when the operators are in close proximity of the extrusion freezer and also hand filling the ice cream cartons. It is observed on a production scale that the operators are frequently walking long distances to check the extrusion freezer and make adjustments to ensure that an undesired shutdown does not occur due to high system pressures. High downstream disturbances due to filling equipment problems and long pipe runs to the liquefier often create these high pressures scenarios. Selecting a load set point that generates the same corresponding system pressure at different ice cream flow rates and for different ice cream formulations is impossible and therefore the operator has no method of selecting extrusion freezer settings that are robust enough to respond to all system pressure disturbances.

In another embodiment, the auger motor load controller is decoupled from the speed control and integrated with the ammonia evaporation temperature control. Additionally, a new inlet pressure controller is added to regulate the extrusion freezer inlet pressure by varying the auger speed.

Thus, the auger motor load controller cascades with the ammonia evaporation temperature controller. This cascaded control generates a master slave relationship in which the output of the auger motor load controller is used to manipulate the set point of the evaporation temperature controller. In this control scheme the operator enters the auger motor load set point from the computer display and the system regulates the motor load by varying the ammonia evaporation temperature set point.

The cascaded controller is as follows:

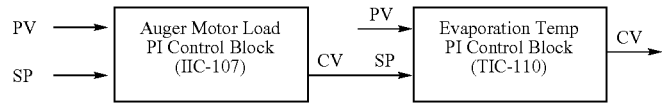

where,
- Auger Motor PI Control Block:
  - PV—Actual auger motor load (0 to 100%)
  - SP—Set point auger motor load entered by operator (0 to 100%)
  - CV—0 to 100% scaled (−6° C. to −42° C.)
- Ammonia Evaporation Temperature PI Control Block:
  - PV—Actual ammonia evaporation temperature (−57° C. to +27° C.)
  - SP—Set point temperature from auger motor load controller (−6° C. to −42° C.)
  - CV—Ammonia suction control valve position (0 to 100%)

In this cascaded control scheme the auger motor load controller action is forward acting, which means that the error calculated by the PI algorithm is equal to the set point minus the process variable (SP−PV). Therefore, because a larger error results in a greater CV output, as the actual auger motor load increases (PV increases) the control variable decreases, resulting in a warmer temperature set point to the evaporation temperature controller, to reduce the load.

Similarly the ammonia evaporation temperature controller action is forward acting. Therefore as the actual ammonia evaporation temperature gets warmer (PV increases) the control valve opens more (CV increases) to reduce the evaporation temperature. One would initially think that this loop should be reverse acting however, because the set point for this loop is scaled in decreasing order (−6° C. to −42° C.) a forward acting loop is used.

The reason for cascading the controllers is to protect the extrusion freezer ammonia barrel from reaching temperatures colder than the temperature rating of the barrel. The evaporation temperature controller clamps the ammonia evaporation temperature to within the ammonia vessel temperature rating (e.g. −50° C.). Although it would be much simpler to allow the auger motor controller to directly modulate the ammonia suction control valve, the resulting evaporation temperature would then depend on the available suction pressure at any given moment and could result in an evaporation temperature colder than the vessel rating.

The extrusion freezer high output pressure alarm interlock preferably remains in effect in this embodiment. Should a high outlet pressure alarm occur, the auger motor load controller automatically switches to a manual mode and the evaporation temperature controller set point is automatically adjusted as described previously. Once the high pressure alarm incident has preferably cleared for at least 3 minutes then the auger motor load controller automatically switches back to automatic mode and resumes regulation of the auger motor load by varying the ammonia evaporation temperature controller set point.

In another embodiment, an extrusion freezer inlet pressure controller regulates the pressure at the inlet of the extrusion freezer by varying the auger speed. The operator enters an inlet pressure set point in Bars from the computer display and the controller automatically varies the auger speed to regulate the inlet pressure.

The inlet pressure control is a "closed-loop" controller. That is, the actual extrusion freezer inlet pressure is fed back to the controller. The inlet pressure controller utilizes a proportional-integral (PI) control algorithm as shown:

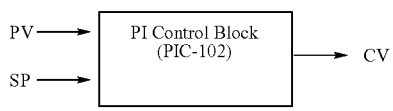

where,
- PV—Extrusion freezer inlet pressure (0 to 17 Bars)
- SP—Set point inlet pressure entered by operator (0 to 17%)
- CV—Auger speed (25 to 100%)

The extrusion freezer inlet pressure controller action is reverse acting. Therefore, because a larger error results in a greater CV output, as the actual inlet pressure increases (PV increases) the auger speed increases (CV increases) to reduce the pressure.

The inlet pressure controller has the capability of manually switching the controller between manual and automatic control modes from the computer display. In manual mode the auger speed control behaves as an open-loop controller and the operator may manually adjust the auger speed set point as described previously.

The addition of the extrusion freezer inlet pressure controller dramatically increases the robustness of the of the extrusion freezer control system, particularly in responding to system pressure disturbances. This in turn results in less operator interaction with the extrusion freezer and more time for the operator to perform the tasks necessary in a full scale production environment.

Furthermore an inlet pressure set point is selected that works for different ice cream flow rates and for different ice cream formulations since the extrusion freezer auger speed varies as a function of the inlet pressure independent of the product flow rate and viscosity. The inlet pressure controller also effectively responds to pressure changes downstream of the extrusion freezer, due to disturbances and increased product viscosity, since the downstream pressure changes affect the extrusion freezer inlet pressure as well.

The auger motor load/ammonia evaporation temperature cascaded controller allows the system to automatically adjust the ammonia evaporation temperature surrounding the extrusion freezer ice cream barrel to achieve a desired auger motor load and hence control the work/energy input to the product. The cascaded controller is very effective in controlling the auger motor load although using the evaporation temperature to control the auger motor load results in a slower response time than the speed controller due to the large thermal lag behavior of the large mass of the steel extrusion system.

The control system of the present invention provides a super-cooled product exiting the extrusion freezer system. This super-cooled product does not need to spend time in a cooling tunnel or hardening system prior to palleting and shipment as is required of other frozen products produced in various ways.

As noted previously, the present invention may be used for extruding chocolate, or liquid aerated plastics or films. Thus, for chocolate extrusion, the chocolate may be heated to generally around 110 degrees F. as it moves through an extruder or other apparatus. For liquid aerated plastics or films, they are heated to around 400 degrees F. In both instances they are then preferably moved through a second extruder and cooled.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A process for improving the texture of a frozen novelty product by applying work or energy to the product while removing heat therefrom with an extruding apparatus having at least one auger, the process comprising:
- providing a mixture of frozen novelty product forming components to an inlet of the extruding apparatus;
- monitoring a pressure profile across the extruding apparatus;
- moving the mixture through the extruding apparatus with the at least one auger operated at a particular speed while subjecting the mixture to a cooling process;
- controlling the amount of heat removed from the mixture by automatically increasing the speed of the at least one auger if the pressure profile across the extruder apparatus exceeds a predetermined range; and
- moving the mixture though an outlet of the extruding apparatus to thus form a frozen novelty product having improved texture.

2. A process in accordance with claim 1 wherein the pressure profile is monitored by one of measuring pressure at the inlet, measuring pressure at the outlet, measuring pressure at least one point in between the inlet and the outlet, and using a function of multiple pressure measurements.

3. A process in accordance with claim 1 wherein the amount of heat removed from the product is further controlled by monitoring temperature of a heat transfer medium, monitoring load of an auger motor, and automatically altering the temperature of the heat transfer medium and the load of the auger motor if at least one of either the temperature of the heat transfer medium or the load of the auger motor is outside a predetermined range.

4. A process in accordance with claim 3 wherein the amount of heat removed from the product is further controlled by monitoring pressure at the outlet and if the outlet pressure exceeds a predetermined amount, then the predetermined range for the heat transfer medium temperature is increased by a predetermined level and the auger motor load is monitored and controlled.

5. A process in accordance with claim 4 wherein the predetermined level is 3° F.

6. A process in accordance with claim 4 wherein the heat transfer medium temperature is measured in predetermined time intervals and the predetermined range for the heat transfer medium temperature is increased in predetermined increments if the outlet pressure continues to exceed the predetermined range.

7. A process in accordance with claim 6 wherein the heat transfer medium temperature is measured every 30 seconds and the predetermined range for the heat transfer medium temperature is increased in 3 degrees F. increments if the outlet pressure continues to exceed the predetermined range.

8. A process in accordance with claim 6 wherein once the outlet pressure is back within the predetermined range for a predetermined amount of time, the auger motor load is monitored and controlled automatically.

9. A process in accordance with claim 3 wherein the heat transfer medium is ammonia and the temperature monitored is an ammonia evaporation temperature.

10. A process in accordance with claim 4 wherein the ammonia evaporation temperature is measured as a function of ammonia evaporation pressure.

11. A process in accordance with claim 1 wherein the frozen novelty is ice cream.

12. A process in accordance with claim 1 wherein the frozen novelty is frozen yogurt.

13. A process in accordance with claim 11 wherein the frozen novelty is one of low fat ice cream having a fat content of 1%-8%, non-fat ice cream, premium ice cream having a fat content in a range of 9%-14%, or super premium ice cream having a fat content in a range of 15%-20%.

14. A process in accordance with claim 1 wherein the frozen novelty is one of sorbet, sherbet or melorene.

15. A process in accordance with claim 1 wherein the predetermined range is dependent upon a flavor of the frozen novelty.

16. A process in accordance with claim 3 wherein the predetermined ranges are dependent upon a flavor of the frozen novelty.

17. A process for improving the texture of a frozen novelty product by applying work or energy to the product while removing heat therefrom with an extruding apparatus having at least one auger, the process comprising:

providing a mixture of frozen novelty product forming components to an inlet of the extruding apparatus;

providing ammonia at a particular pressure as a coolant;

monitoring a pressure profile across the extruding apparatus;

controlling the amount of heat removed from the mixture by:

moving the mixture through the extruding apparatus with the at least one auger operated at a particular speed by a motor while subjecting the mixture to a freezing process;

automatically increasing the speed of the at least one auger if the pressure profile across the extruding apparatus exceeds a predetermined range;

monitoring the pressure of the ammonia coolant to determine ammonia temperature;

monitoring load of the auger motor; and automatically altering the temperature of the ammonia and the load of the auger motor if at least one of either the temperature of the ammonia and the load of the auger motor is outside a predetermined range; and moving the mixture through an outlet of the extruding apparatus to thus form a frozen novelty product having improved texture.

18. A process in accordance with claim 17 wherein the pressure profile is monitored by one of measuring pressure at the inlet, measuring pressure at the outlet, measuring pressure at least one point in between the inlet and the outlet, and using a function of multiple pressure measurements.

19. A process in accordance with claim 17 wherein the amount of heat removed from the product is further controlled by monitoring pressure at the outlet and if the outlet pressure exceeds a predetermined amount, then the predetermined range for the coolant temperature is increased by a predetermined level and the auger motor load is monitored and controlled.

20. A process in accordance with claim 19 wherein the predetermined level is 3° F.

21. A process in accordance with claim 19 wherein the coolant temperature is measured in predetermined time intervals and the predetermined range for the coolant temperature is increased in predetermined increments if the outlet pressure continues to exceed the predetermined range.

22. A process in accordance with claim 21 wherein the coolant temperature is measured every 30 seconds and the predetermined range for the coolant temperature is increased in 3° F. increments if the outlet pressure continues to exceed the predetermined range.

23. A process in accordance with claim 22 wherein once the outlet pressure is back within the predetermined range for a predetermined amount of time, the auger motor load is monitored and controlled automatically.

24. A process in accordance with claim 17 wherein the frozen novelty is ice cream.

25. A process in accordance with claim 17 wherein the frozen novelty is yogurt.

26. A process in accordance with claim 17 wherein the frozen novelty is low fat ice cream having a fat content of 1%-8%.

27. A process in accordance with claim 17 wherein the predetermined ranges are dependent upon a recipe of the frozen novelty.

28. A process in accordance with claim 19 wherein the predetermined range is dependent upon a recipe of the frozen novelty.

29. A process in accordance with claim 28 wherein the predetermined outlet pressure amount is dependent upon a recipe of the frozen novelty.

30. A process for improving the texture of a frozen novelty product by altering temperature of a mixture of frozen novelty product forming components and by removing heat from the mixture with an extruding apparatus having at least one auger, the process comprising:

providing the mixture to an inlet of the extruding apparatus;

monitoring a pressure profile of the extruding apparatus;

moving the mixture through the extruding apparatus with the at least one auger operated at a particular speed while subjecting the mixture to a thermodynamic process that removes heat from the mixture;

controlling the amount of heat removed from the mixture by automatically increasing the speed of the at least one auger if the pressure profile across the extruder apparatus exceeds a predetermined range; and moving the mixture through an outlet of the extruding apparatus to thus form a frozen novelty product having improved texture.

31. A process in accordance with claim 30 wherein the pressure profile is monitored by one of measuring pressure at the inlet, measuring pressure at the outlet, measuring pressure at least one point in between the inlet and the outlet, and using a function of multiple pressure measurements.

32. A process in accordance with claim 30 wherein the amount of heat removed from the product is further controlled by monitoring temperature of a heat transfer liquid, monitoring load of an auger motor, and automatically altering the temperature of the heat transfer liquid and the load of the auger motor if at least one of either the temperature of the heat transfer liquid or the load of the auger motor is outside a predetermined range.

33. A process in accordance with claim 32 wherein the amount of heat removed from the product is further controlled by monitoring pressure at the outlet and if the outlet pressure exceeds a predetermined amount, then the predetermined range for the heat transfer liquid temperature is increased by a predetermined level and the auger motor load is monitored and controlled manually.

34. A process in accordance with claim 33 wherein the predetermined level is 3° F.

35. A process in accordance with claim 33 wherein the heat transfer liquid temperature is measured in predetermined time intervals and the predetermined range for the heat transfer liquid temperature is increased in predetermined increments if the outlet pressure continues to exceed the predetermined range.

36. A process in accordance with claim 35 wherein the heat transfer liquid temperature is measured every 30 seconds and the predetermined range for the heat transfer liquid temperature is increased in 3° F. increments if the outlet pressure continues to exceed the predetermined range.

37. A process in accordance with claim 35 wherein once the outlet pressure is back within the predetermined range for a predetermined amount of time, the auger motor load is monitored and controlled automatically.

38. A method for improving the texture of a frozen novelty product, the method comprising:

providing a chilled mixture of frozen novelty product forming components to an aerator;

aerating the chilled mixture with the aerator to create an aerated mixture;

subjecting the aerated mixture to a shear rate treatment at a particular speed within an extruder freezer while simultaneously subjecting the aerated mixture to a low temperature;

controlling the amount of heat removed from the mixture by:

monitoring at least one of a pressure profile and a temperature profile of the aerated mixture while it is within the extruder freezer; and automatically adjusting at least one operation parameter of the extruder freezer, including increasing the speed of the shear rate treatment and temperature to which the aerated mixture is subjected, when the pressure exceeds a predetermined range based upon monitoring of the aerated mixture to thus form a frozen novelty product having improved texture.

39. A method in accordance with claim 38 wherein the amount of heat removed from the product is further controlled by controlling at least one parameter is selected from the group consisting of auger speed of an auger within the extruder freezer and temperature of the extruder freezer.

40. A method in accordance with claim 38 wherein the extruder freezer comprises two parallel augers.

41. A process in accordance with claim 38 wherein the amount of heat removed from the product is further controlled by monitoring temperature of a heat transfer medium, monitoring load of an auger motor, and automatically altering the temperature of the heat transfer medium and the load of the auger motor if at least one of either the temperature of the heat transfer medium or the load of the auger motor is outside a predetermined range.

42. A process in accordance with claim 38 wherein the amount of heat removed from the product is further controlled by monitoring pressure at the outlet and if the outlet pressure exceeds a predetermined amount, then the predetermined range for the heat transfer medium temperature is increased by a predetermined level and the auger motor load is monitored and controlled.

43. A method in accordance with claim 42 wherein the predetermined level is 3° F.

44. A method in accordance with claim 43 wherein the heat transfer medium temperature is measured in predetermined time intervals and the predetermined range for the heat transfer medium temperature is increased in predetermined increments if the outlet pressure continues to exceed the predetermined range.

45. A method in accordance with claim 44 wherein the heat transfer medium temperature is measured every 30 seconds and the predetermined range for the heat transfer medium temperature is increased in 3° F. increments if the outlet pressure continues to exceed the predetermined range.

46. A method in accordance with claim 44 wherein once the outlet pressure is back within the predetermined range for a predetermined amount of time, the auger motor load is monitored and controlled automatically.

47. A method in accordance with claim 41 wherein the heat transfer medium is ammonia and the temperature monitored is an ammonia evaporation temperature.

48. A method in accordance with claim 42 wherein the ammonia evaporation temperature is measured as a function of ammonia evaporation pressure.

* * * * *

UNITED STATES PATENT AND TRADEMARK OFFICE
CERTIFICATE OF CORRECTION

PATENT NO. : 7,655,265 B2  Page 1 of 1
APPLICATION NO. : 10/886008
DATED : February 2, 2010
INVENTOR(S) : D'Arcangelis et al.

It is certified that error appears in the above-identified patent and that said Letters Patent is hereby corrected as shown below:

Title Page:
Item (56) References Cited, FOREIGN PATENT DOCUMENTS:
  After "EP 0401512 A1" change "5/1990" to -- 12/1990 --;
  After "EP 0877558 B1" change "1/1997" to -- 11/1998 --;
  After "JP 62-074245 A" change "6/1987" to -- 4/1987 --;
  After "JP 62-055067 A" change "10/1987" to -- 3/1987 --;
  After "JP 03-027276 A" change "5/1991" to -- 2/1991 --;
  After "WO 97/46114 A1" change "11/1997" to -- 12/1997 --;
  After "WO 98/09534 A3" change "12/1998" to -- 3/1998 --; and
  After "WO 98/09536 A3" change "12/1998" to -- 3/1998 --.

Item (56) References Cited, OTHER PUBLICATIONS:
Windhab, E. et al. reference (first occurrence), change "manufactoure"; 19995," to -- manufacture"; 1995 --; and change "2835" to -- 28-35 --;
Windhab, E. et al. reference (third occurrence), change "NEw" to -- New --; and before "ice Cream International Dairy Federation," insert -- 1998 --.

Column 14:
Line 58 (claim 1, line 16), before "an outlet" change "though" to -- through --.

Column 18:
Line 15 (claim 39, line 3), before "selected" delete "is".

Signed and Sealed this

Fourth Day of May, 2010

David J. Kappos
*Director of the United States Patent and Trademark Office*